H. G. VOIGHT.
LOCK.
APPLICATION FILED MAY 4, 1916.

1,243,016.

Patented Oct. 16, 1917.
5 SHEETS—SHEET 4.

WITNESSES:
F. A. Carlson INVENTOR
H. G. Voight
BY
ATTORNEY

H. G. VOIGHT.
LOCK.
APPLICATION FILED MAY 4, 1916.

1,243,016.

Patented Oct. 16, 1917.
5 SHEETS—SHEET 5.

UNITED STATES PATENT OFFICE.

HENRY G. VOIGHT, OF NEW BRITAIN, CONNECTICUT, ASSIGNOR TO SARGENT & COMPANY, OF NEW HAVEN, CONNECTICUT, A CORPORATION OF CONNECTICUT.

LOCK.

1,243,016.  Specification of Letters Patent.  Patented Oct. 16, 1917.

Application filed May 4, 1916. Serial No. 95,376.

*To all whom it may concern:*

Be it known that I, HENRY G. VOIGHT, a citizen of the United States, residing in New Britain, county of Hartford, and State of Connecticut, have invented certain new and useful Improvements in Locks, of which the following is a full, clear, and exact description.

This invention relates to locks, and more particularly to door locks of the mortise type embodying dead bolt mechanism adapted for actuation by a pin tumbler cylinder lock, and my improvements are particularly applicable to locks for the corridor doors of hotels. It will be obvious from the following description, however, that my improvements are applicable to locks of various types.

One of the objects of my invention is to provide very simple and efficient tumbler mechanism for a lock in which a dead bolt is protractable from the inside of the room by a thumb turn, and from the outside of the room by a plurality of keys adapted to a cylinder lock, the construction being such that when a room is locked from the inside by means of the thumb turn, access to it can only be had by the emergency key.

Another object of the invention is to provide a simple improved form of shut-out mechanism to be used in connection with a dead bolt so that when the bolt is protracted by the emergency key, it cannot be retracted by a key of lower order.

The invention also has in view the general improvement in the construction and operation of devices of the class to which the invention relates.

To these and other ends, the invention consists in the novel features and combinations of parts to be hereinafter described and claimed.

In the accompanying drawing.

I have shown my improvements applied to a mortise lock having a single dead bolt, which is protractable and retractable from the inside of the room by means of a thumb turn, and from the outside of the room by means of a cylinder lock having a series of different keys. The lock also has a knob controlled latch bolt. In the particular form shown, the usual mortise lock case 20, having the face plate 21, is equipped with a dead bolt 22 operative from the outside of the room by means of a cylinder lock 23, which, in this instance, is mounted in the cap plate of the case, said dead bolt being operative from the inside of the room by means of a thumb turn (not shown) engaging a thumb turn hub 24 of ordinary type. Beneath the dead bolt, a latch bolt 25 is normally projected out of the face plate by a spring 26, and is adapted to be retracted by knobs (not shown) connected in the usual way with a hub 27, actuating a yoke or knob shoe 28, which retracts the latch bolt in the customary manner by engaging a cross-head 29 on the latch bolt stem.

Figures 1, 9:
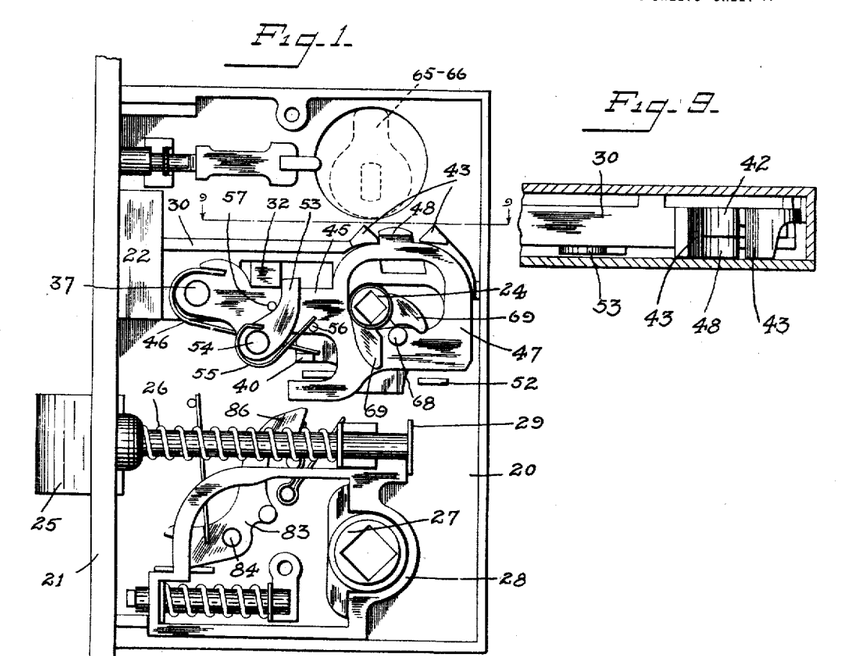
Figure 1 is an elevation of a lock embodying my improvements, with the cap plate removed, showing the parts in the normal position.
Fig. 9 is a section on line 9—9 of Fig. 1.
Figure 10:
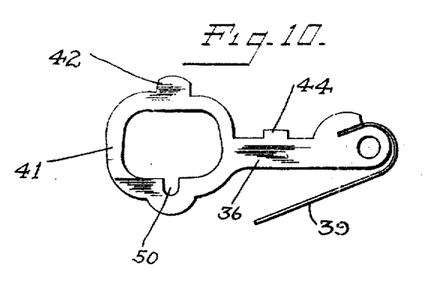
Fig. 10 is a detail rear view of the primary tumbler.

The dead bolt 22 is provided with a shank portion 30, having a slot 31, by means of which the bolt is guided on a fence or post 32 cast on the back of the case. The bolt shank is also provided with a slot 33 to clear the thumb turn hub 24, which is mounted to oscillate between the back of the lock case and the cap plate, as usual. At its lower rear portion, the shank 30 of the dead bolt is provided with a longitudinal groove 34, by means of which the bolt is guided on a fin 35 cast on the back of the case. The bolt is provided with a primary tumbler 36, shown in detail in Fig. 10, said tumbler pivoted on a post 37 carried by the dead bolt and being actuated by the usual spring 39, supported against a lug 40 projecting outward from the bolt shank. At its rear portion, the tumbler 36 is provided with a loop 41 extending around the hub 24. On the upper part of this loop 41 is an operating projection 42, which is normally located between the talons 43 on the upper part of the bolt shank, which talons are adapted to be engaged by certain parts of the cylinder lock 23, for the purpose hereinafter described. As shown in Fig. 9, the talons 43 are wider than the projection 42 of the primary tumbler 36. On the upper edge of tumbler 36 is a lug 44 adapted to engage the fence or stump 32 so as to lock the bolt in the protracted or retracted position. A secondary tumbler 45 is mounted on the bolt alongside the primary tumbler 36, said secondary tumbler being pivoted on the same post 37 and being also provided with a spring 46 supported against the lug 40. Furthermore, this secondary tumbler 45 is provided with a loop 47, overlying the loop 41 of the primary tumbler around the thumb turn hub, and provided at its upper part with an operating projection 48 closely adjacent to the operating projection 42 within the space between the talons 43 of the dead bolt. The secondary tumbler is provided at its lower part with an outwardly projecting pin 49 adapted to engage a recess or socket 50 in the lower part of the loop 41 of the primary tumbler so that while the primary tumbler may be independently actuated, the depression of the secondary tumbler will cause the primary tumbler to be depressed at the same time, for the purpose hereinafter described. When the secondary tumbler is actuated, a projection 51 on the lower rear part thereof is adapted to pass beneath a guide lug 52 on the case.

Figure 2:
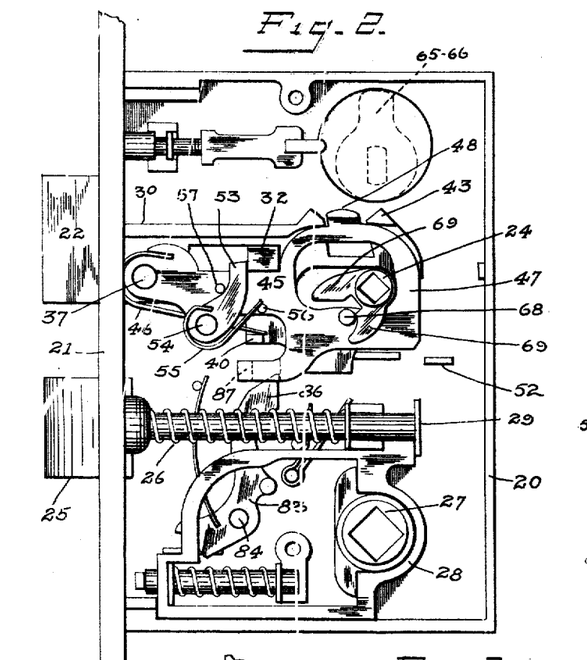
Fig. 2 is a similar view, showing the dead bolt protracted by the thumb turn hub.
Figure 3:
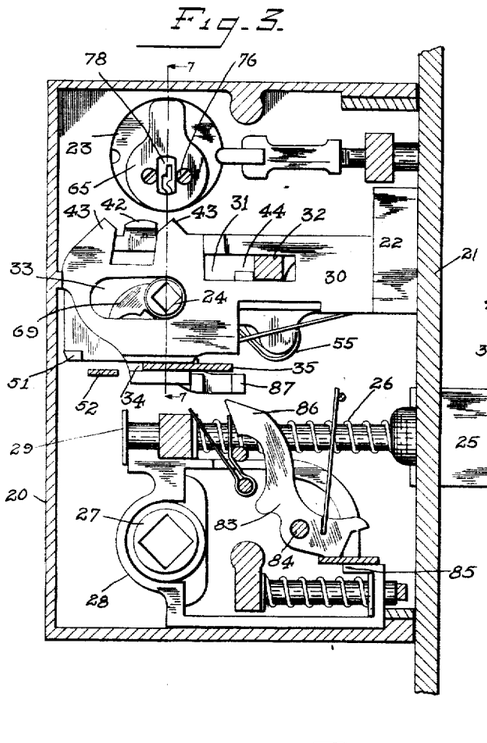
Fig. 3 is a reverse sectional view of the lock, showing the parts in the positions illustrated in Fig. 1.
Figure 6:
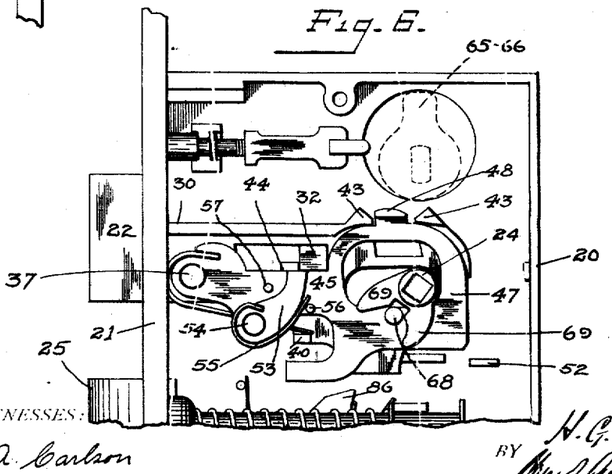
Fig. 6 is a similar view, showing the dead bolt fully protracted by the change key.
Figure 11:
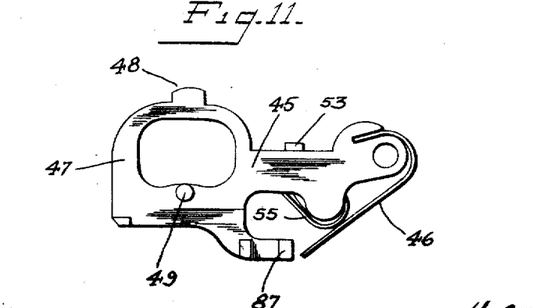
Fig. 11 is a detail rear view of the emergency or secondary tumbler.
Figure 12:
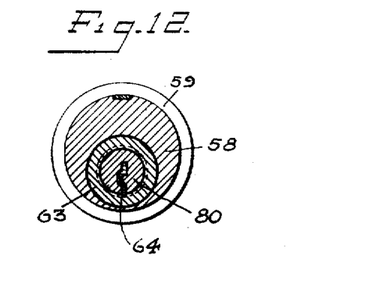
Fig. 12 is a section on line 12—12 of Fig. 7.
Figure 13:
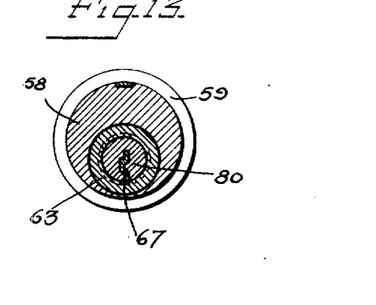
Fig. 13 is a section on line 13—13 of Fig. 8.
Figure 14:
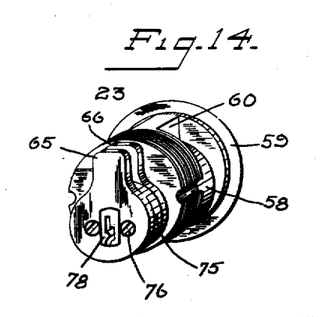
Fig. 14 is a rear perspective view of the cylinder lock detached.
Figure 15:
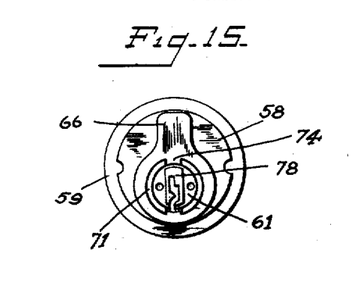
Fig. 15 is a rear elevation of the cylinder lock, with the primary rollback and sleeve detached therefrom.
Figure 16:
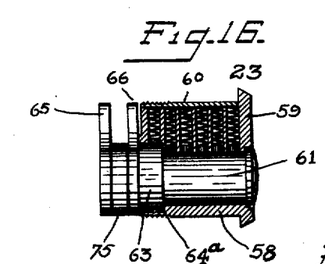
Fig. 16 is a longitudinal section of the cylinder with certain parts in elevation.
Figure 17:
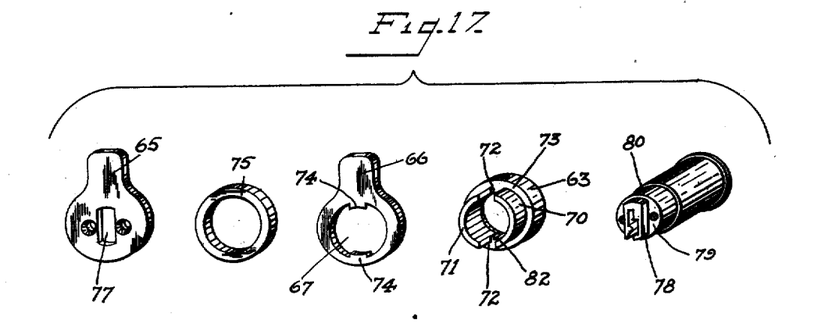
Fig. 17 comprises detail views of certain parts of the cylinder lock.
Figure 18:
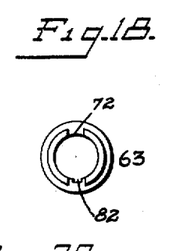
Figs. 18 and 19 are detail views of the cylinder lock sleeve.
Figure 19:
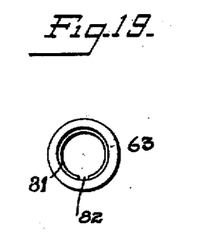

Instead of having a fixed lug or abutment to coöperate with a fence or stump on the case, the secondary tumbler 45 is provided with a movable abutment member 53 which, in this case, coöperates with the fence 32. However, while I have shown the movable abutment member 53 coöperating with the same fence which locks the primary tumbler, this is not an essential feature in all aspects of the invention. The movable abutment member is pivoted to the secondary tumbler by a pivot pin 54, said abutment member being in the form of an upwardly extending lever applied to the outer face of the secondary tumbler and having its upper extremity projecting above the upper edge of the secondary tumbler, as shown clearly in Fig. 11. In the present case, the upper end of the abutment member is in line with the lug 44 of the primary tumbler when the parts are in the position shown in Fig. 1. The abutment member is adapted to swing on the pivot 54 in opposition to a spring 55, which is connected with said member and supported against the pin 56 on the secondary tumbler. The spring 55 opposes swinging movement of the member 53 in the direction of the pin 56, and a similar pin 57 at the opposite side of the abutment member limits movement thereof in the opposite direction. The arrangement is such that when the parts are in the position shown in Fig. 1, the abutment member 53 will offer no appreciable resistance to the protraction of the bolt, and therefore the secondary tumbler 45 can be pulled forward with the bolt without depression of said secondary tumbler owing to the fact that the spring 55 permits the member 53 to yield and move out of the way of the fixed fence 32 as the bolt is being projected. Under these circumstances, the upper extremity of the movable abutment 53 is still in contact with the lower surface of the fence 32 when the dead bolt reaches its fully protracted position, as shown in Fig. 6, and therefore the member 53 cannot pass up into a position in front of the fence for locking the bolt in protracted position by means of the secondary tumbler. When, however, the secondary tumbler is given a full depression, the member 53 may be swung clear of the fence 32 and up into the locking position in front of the fence, as shown in Fig. 2.

Figure 7:
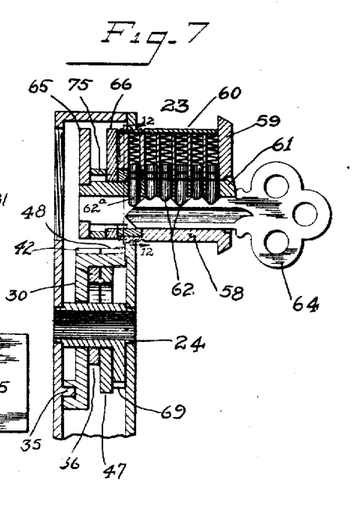
Fig. 7 is a section on line 7—7 of Fig. 3, showing the change key inserted into the cylinder lock.
Figure 8:
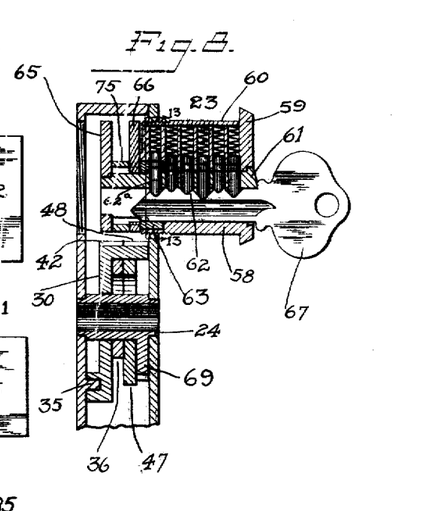
Fig. 8 is a similar section, showing the emergency key inserted into the cylinder lock.

Referring now to the construction of the cylinder lock 23, the cylinder casing 58 is of the usual construction, having the face plate or escutcheon 59, a pin tumbler housing 60, and the usual threaded rear portion engaging a threaded hole in the cap of the lock case. The key plug 61 having the usual keyway is rotatable in a bore through the cylinder, and is somewhat longer than the cylinder so that it projects out of the latter at the rear end. This key plug 61 is adapted to be locked to the casing 58 by the usual sectional pin tumblers 62. Surrounding the rear portion of the key plug is a concentric sleeve 63, which fits within a comparatively shallow recess 64ª in the rear part of the cylinder concentric with the key plug recess. This sleeve 63 is adapted to coöperate with the rearmost pin tumbler 62ª which, under normal conditions, is so positioned by its actuating spring as to lock the sleeve 63 to the casing while offering no resistance to the rotation of the key plug in the sleeve. In the particular form shown, there are six pin tumblers in all, the sleeve 63 coöperating with the rearmost pin tumbler only, and the arrangement is such that under normal conditions, with no key inserted into the lock, the five front pins will lock the key plug to the casing, whereas the rear pin 62ª will only lock the sleeve to the casing. When the change key 64 is inserted into the cylinder, as shown in Fig. 7, this actuates the five pins 62 so as to release the key plug for rotation. This change key has no effect upon the pin tumbler 62ª because it is not long enough to reach and displace said pin tumbler. Consequently, the change key will rotate the key plug, and with it a rollback 65, secured to the rear end of the key plug, whereas the sleeve 63 will remain stationary, and a rollback 66 carried by the sleeve will also remain stationary. On the other hand, when the emergency key 67 is inserted into the lock, as shown in Fig. 8, it will not only release the five pin tumblers 62, but it will also actuate the pin tumbler 62ª to lock the sleeve 63 to the key plug and release it from the casing. This is due to the fact that the emergency key 67 is longer than the change key 64 and is bitted to shift the pin tumbler 62ª into the position shown in Fig. 8. It will be understood, therefore, that the emergency key will rotate the rollbacks 65, 66 together in parallel planes. The rollback 65, which may be referred to as the primary rollback, inasmuch as it is the only one rotated by the change key, is located in the plane of the primary tumbler 36 and is adapted to pass in between the talons 43 of the bolt and engage the projection 42 of the primary tumbler so as to operate the bolt by actuation of the primary tumbler alone. When the change key is inserted into the lock, the rollback 65 will be rotated alone so as to actuate the primary tumbler, and the secondary tumbler will not be depressed at all but will simply be carried forward by the bolt, thereby carrying the movable abutment member 53 into the position shown in Fig. 6 when the bolt is protracted. The bolt can then be readily retracted by the change key by reversing the direction of rotation, as will be manifest. When, however, the emergency key 67 is used, both rollbacks 65, 66 will be rotated, consequently both the primary tumbler and the secondary tumbler will be actuated. In this case, the secondary or emergency rollback 66 will engage the projection 48 of the secondary tumbler and depress said tumbler so as to carry the lug 51 thereof down below the guide lug 52 on the lock case. The secondary tumbler 45, in being depressed will also cause the depression of the primary tumbler owing to the fact that the pin 49 rests in the recess 50, as previously described. When the bolt is to be protracted by the emergency key, the secondary tumbler is swung down so that the lug 51 passes beneath the lug 52, and then while the bolt continues its forward movement and the lug 51 is still beneath the lug 52, the upper extremity of the movable member 53 will be carried beneath and clear of the fence 32, and will pass up in front of the fence as the bolt reaches its fully protracted position, as shown in Fig. 2. The lug 52 on the case prevents the member 53 from engaging the fence until it has been moved into position in front of the fence. It will be understood, therefore, that in this operation the movable member 53 is not actuated, and that when the bolt is fully protracted it acts in connection with the pin 57 as a stop or shut-out member to prevent the withdrawal of the bolt without actuation of the secondary tumbler. The bolt can readily be withdrawn by the emergency key, however, because this key gives the secondary tumbler a full depression and swings the member 53 clear of the fence.

The operation of the bolt by means of the thumb turn hub 24 is practically the same as that by the emergency key. The thumb turn operates the secondary tumbler (and with it the primary tumbler) by engaging an operating pin or projection 68, located between wings 69 on the thumb turn hub. When the bolt is protracted by the thumb turn, the member 53 occupies a shut-out or stop position in front of the fence, as shown in Fig. 2, and it is then impossible to retract the bolt from the outside of the door by means of a change key, or any key of low order, which will not actuate the emergency rollback 66, as will be understood.

Reverting to the detail construction of the cylinder lock, it will be observed that the sleeve 63 is in the form of a ring having a rabbet 70 cut in the rear part thereof so as to present a thin rearwardly extending flange 71, which is cut away at diametrically opposite points, as shown at 72. The emergency rollback 66 is provided with an opening 67 adapted to tightly fit around the flange portion 71 of the sleeve against a shoulder 73. The rollback 66 is non-rotatively interlocked with the sleeve by means of small lugs 74 on the rollback extending into the opening 67 and engaging the cutaway portions or recesses 72 of the sleeve, as shown more particularly in Fig. 15. After the emergency rollback has been fitted over the sleeve, a spacing washer 75 is fitted over the flange portion 71, and the primary rollback 65 is then secured to the rear end of the key plug by screws 76. The rollback 65 has an opening 77 adapted to fit closely over a short integral extension 78 on the rear end of the key plug 61, and when the rollback 65 has been placed over this extension it will abut the rear face of the key plug at 79, and it will also abut the rear face of the washer 75, and the rear face of the flange, which are flush with the surface 79 of the key plug. It will be understood, therefore, that when the rollback 65 is secured in place by the screws 76, the emergency rollback will be clamped in place against the shoulder 70 of the sleeve and held against rearward displacement by the spacing washer 75 and the primary rollback.

Figure 20:
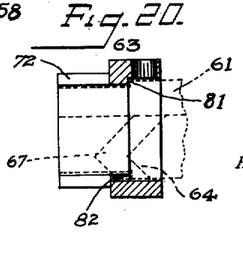
Fig. 20 is an enlarged detail of the cylinder.

It will be observed that the sleeve 63 rotates about a reduced portion 80 at the rear of the key plug, and that the sleeve is provided with a rabbet 81 at the front inner part. At the lower part of the sleeve, a groove 82 is cut from the rabbet 81 to the lower recess 72, and this groove 82 is adapted to be engaged by the inner extremity of the emergency key when the latter is inserted into the cylinder lock, as shown more particularly in Fig. 20. In this manner, the emergency key is locked directly to the sleeve, and it is not necessary for the sleeve to be carried from the key plug by the pin 62ª. In this manner, the pin tumbler 62ª is relieved of strain.

Figure 4:
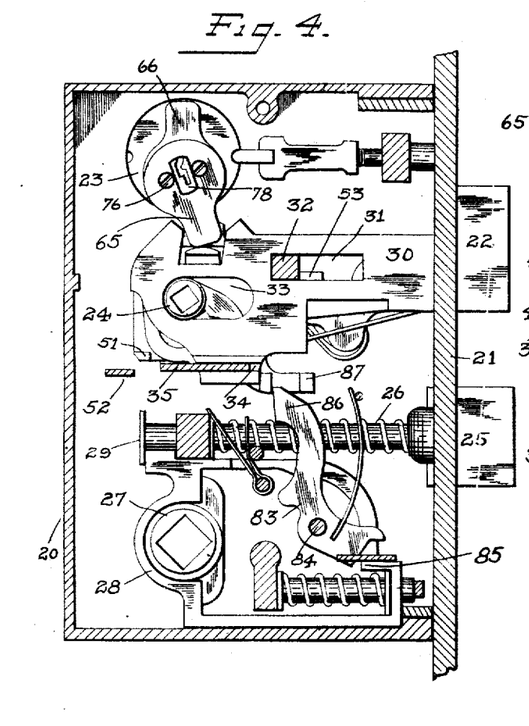
Fig. 4 is a reverse view, showing the dead bolt protracted by the thumb turn hub, and illustrating the position of the parts when it is attempted to retract the dead bolt by means of the change key, or the maid's key, from the outside.
Figure 5:
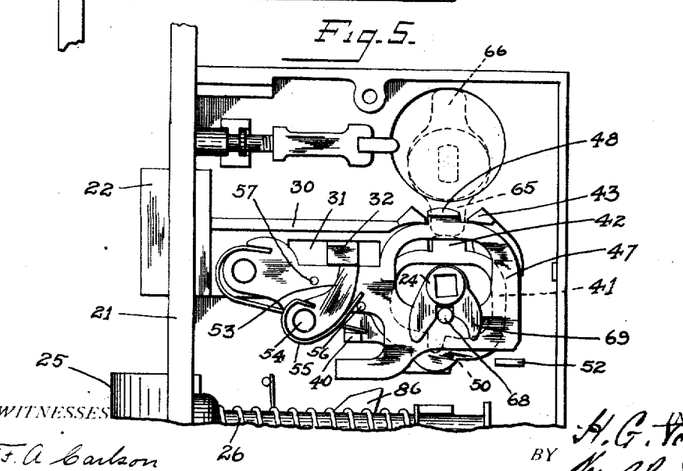
Fig. 5 is a front elevation of the upper part of the lock, showing the dead bolt partly protracted by the change key.

When the dead bolt is protracted from the inside of the room by the thumb turn, or from the outside of the room by the emergency key, the knob mechanism is dogged automatically by a swinging dog 83, pivoted at 84, and adapted to block the operation of the knob shoe 27 by occupying a position back of a shoulder 85 on said shoe, as shown in Fig. 4. When the dead bolt is protracted by the thumb turn, for example, the secondary tumbler is depressed to such an extent as to engage the upper end portion 86 of the dog 83, and shift said dog from the position shown in Fig. 1 to that shown in Fig. 4, which is the dogging position. The lower part of said secondary tumbler is provided with a forked portion 87 adapted to straddle the upper part of the dog 83, and to swing it on its pivot to dog and release the knob shoe when the bolt is protracted or retracted respectively by means which cause a full depression of the secondary tumbler; but when the bolt is protracted by the change key, the secondary tumbler is not depressed, and therefore the dogging member 83 is unaffected.

Various changes may be made in the details of the construction without departing from the scope of the invention as defined in the claims.

I do not claim broadly herein the combination of a dead bolt, a fence, a plurality of tumblers pivoted to said bolt so as to be carried thereby, one of said tumblers having a rigid shoulder or abutment to coöperate with said fence, and another tumbler having a movable shoulder or abutment to coöperate with said fence, and means for actuating said tumblers and protracting and retracting the bolt, as claimed in my application Serial No. 14,124, filed March 13, 1915.

I do not claim herein the improved cylinder lock per se as the same forms the subject matter of my application, Serial No. 155,777, filed March 19, 1917.

What I claim is:

1. In a lock, the combination of a dead bolt, a tumbler carried thereby and bodily movable by the movement of said bolt, a fence, a thumb turn member to protract said bolt and move said tumbler into interlocking engagement with said fence, a key for moving said tumbler into or out of interlocking engagement with said fence and protracting or retracting the bolt, and another key adapted to protract the bolt but inoperative to retract it when it has been protracted by said thumb turn member or by said first key; substantially as described.

2. In a lock, the combination of a dead bolt, a fence, a tumbler carried by and bodily movable with said dead bolt, an abutment carried by said tumbler to coöperate with said fence, a thumb turn member for protracting said bolt and interlocking said abutment member with said fence so as to deadlock the bolt in protracted position, a cylinder lock mechanism, a key for said cylinder lock mechanism adapted to move said abutment out of interlocking engagement with said fence and retract the bolt, and another key for said cylinder lock mechanism operative to protract the bolt but inoperative to retract the same when it has been protracted by said thumb turn member or said first key; substantially as described.

3. In a lock, a dead bolt, a fence, a tumbler pivoted on said bolt, a movable spring pressed abutment member carried by the tumbler to coöperate with said fence, a thumb turn member to protract the bolt and move said abutment member into interlocking engagement with said fence so as to deadlock the bolt in protracted position, a cylinder lock, a key for said cylinder lock adapted to protract said bolt but inoperative to interlock said tumber with said fence or to release it therefrom, and a second key for said cylinder lock adapted to protract and retract said bolt and to swing said abutment member into and out of interlocking engagement with said fence; substantially as described.

4. In a lock, a dead bolt, two tumblers carried thereby each having an abutment, fence portions on the lock case to coöperate with the respective abutments, a thumb turn member to protract the bolt and swing both tumblers so that their abutments interlock with the respective fence portions, a cylinder lock mechanism, a key for said cylinder lock mechanism adapted to protract the bolt and to swing both abutments into interlocking engagement with the respective fence portions, and a second key for said cylinder lock mechanism adapted to protract the bolt and interlock one of said abutments with its corresponding fence portion but inoperative to interlock the abutment of the other tumbler with its corresponding fence portion; substantially as described.

5. In a lock, the combination of a dead bolt, a fence, a plurality of tumblers pivoted to said dead bolt, one of said tumblers having a rigid shoulder or abutment to coöperate with said fence, another tumbler having a movable shoulder or abutment to coöperate with said fence, a cylinder lock mechanism, and independently rotatable rollbacks for said cylinder lock mechanism adapted to actuate the respective tumblers; substantially as described.

6. In a lock, a dead bolt, a fence, a plurality of tumblers pivoted to said bolt, one of said tumblers having a rigid shoulder or abutment to coöperate with said fence, another tumbler having a movable shoulder or abutment to coöperate with said fence, a cylinder lock, two independently mounted rollbacks on said cylinder lock, a key for turning both rollbacks and thereby actuating both tumblers, and another key for turning only one of said rollbacks and thereby actuating only one of said tumblers; substantially as described.

7. In a lock, a dead bolt, a fence, two tumblers pivoted on said dead bolt, one of said tumblers having a rigid abutment to coöperate with said fence, the other tumbler having a movable abutment to coöperate with said fence, a cylinder lock, two independently mounted rollbacks on said cylinder lock, a key to turn both rollbacks and thereby actuate both tumblers, a second key adapted to operate the rollback appurtenant to the tumbler having the rigid abutment but inoperative on the other rollback and the other tumbler, and a thumb turn member for actuating both of said tumblers and the bolt; substantially as described.

8. In a lock, a dead bolt, a fence, two tumblers carried by said dead bolt, one of said tumblers having a rigid shoulder or abutment to coöperate with said fence, the other tumbler having a movable shoulder or abutment to coöperate with said fence, a cylinder lock, two rollbacks mounted on said cylinder lock for actuating the respective tumblers, a key to turn both rollbacks, and another key to turn one rollback but inoperative on the other rollback, both of said rollbacks always rotatable about the same center; substantially as described.

9. In a lock, the combination of a dead bolt, two tumblers carried thereby, a fence, a cylinder lock at the outside of the door, a key for said cylinder lock adapted to protract and retract the bolt, and means operable from the inside of the door for protracting said bolt and moving both of said tumblers into interlocking engagement with said fence so that the bolt cannot be retracted by said key; substantially as described.

10. In a lock, the combination of a dead bolt, a case therefor, a fence fixed to the case, two pivoted tumblers mounted on the bolt, a cylinder lock, a key for said cylinder lock adapted to protract the bolt and move one of said tumblers into interlocking engagement with said fence but inoperative to interlock the other tumbler with said fence, and a thumb turn member for protracting the bolt and moving both of said tumblers into interlocking engagement with said fence, said key inoperative to retract the bolt when protracted by said thumb turn member; substantially as described.

11. In a lock, a dead bolt, a tumbler carried thereby, a fence, means operable from the inside of the door to protract said bolt and interlock said tumbler with said fence, a cylinder lock, a key for said cylinder lock adapted to protract and retract said bolt and to interlock said tumbler with said fence and release it therefrom, and a second key for said cylinder lock, operable to protract said bolt but inoperative to release said tumbler from said fence when it has been engaged therewith by said inside operating means.

12. In a lock, the combination of a dead bolt protractable from either side of the door, a tumbler carried by said bolt and movable bodily therewith, a fence on the lock case adapted to lock the bolt in position by engagement with said tumbler, manually operable means at one side of the door for protracting said bolt and locking it in the protracted position by engagement of said tumbler with said fence, and a key operative to protract the bolt from the opposite side of the door but inoperative to lock it in the advanced position by said tumbler; substantially as described.

13. In a lock, the combination of a dead bolt, a tumbler carried by and bodily movable with said dead bolt, a fence, a movable abutment carried by said tumbler to coöperate with said fence, means operable from one side of the door for protracting said bolt and thereby moving said abutment into locking engagement with said fence, and means operable from the opposite side of the door for protracting the bolt, said last named means inoperative to interlock said abutment with said fence when the bolt is protracted; substantially as described.

14. In a cylinder lock, the combination of a dead bolt, a tumbler carried thereby and bodily movable therewith, a fence fixed relatively to the lock case, a movable lug on the tumbler, a thumb turn member to protract said bolt from the inside of the door and thereby move said lug into interlocking engagement with the fence with the bolt in the protracted position, a key operable from the outside of the door for releasing said lug from said fence and retracting the bolt, and another key operable from the outside of the door to move the bolt from the retracted position to the protracted position but inoperative to release said lug from said fence when the bolt has been protracted by said thumb turn member or by said first key; substantially as described.

15. In a lock, the combination of a dead bolt protractable from either side of the door, a tumbler pivoted to said bolt and bodily movable therewith, a fence fixed relatively to the lock case, a movable abutment on said tumbler to coöperate with said fence, a member for protracting said bolt from one side of the door and locking it in the protracted position by giving said tumbler a swinging movement of a certain amplitude, a spring acting on said abutment to enable it to yield when the bolt is protracted without swinging the tumbler to the aforesaid extent, and means at the opposite side of the door for protracting said bolt without swinging said tumbler to such extent.

16. In a lock, a dead bolt, a tumbler pivoted thereto, a fence, a thumb turn member directly engageable with said tumbler to interlock it with said fence and release it therefrom and also operable to protract and retract said bolt, a key for moving said tumbler into and out of interlocking engagement with said fence and protracting and retracting said bolt, and another key adapted to protract the bolt but inoperative to disengage said tumbler from said fence when it has been interlocked therewith by said thumb turn member or by said first key.

17. In a lock, a dead bolt, a tumbler pivoted thereto and movable bodily therewith, a fence, a thumb turn member directly engageable with said tumbler to interlock it with said fence and release it therefrom and also operable to protract and retract said bolt, a cylinder lock, a key for said cylinder lock adapted to move said tumbler into and out of interlocking engagement with said fence and to protract and retract the bolt, and another key for said cylinder lock adapted to protract the bolt but inoperative to disengage said tumbler from said fence when it has been interlocked therewith by said thumb turn member or by said first key.

18. In a lock, a dead bolt, a fence, primary and secondary tumblers on said bolt to coöperate with said fence, a thumb turn member to protract said bolt operable on both of said tumblers to interlock them with said fence, and a key for protracting said bolt and interlocking the primary tumbler with said fence but inoperative to interlock the secondary tumbler with said fence or to release it therefrom when it has been interlocked therewith by said thumb turn member.

19. In a lock, a dead bolt, primary and secondary tumblers carried thereby, a fence with which said tumblers are engageable, a thumb turn member to protract and retract said bolt, adapted to interlock both of said tumblers with said fence, a change key for protracting and retracting said bolt, operable to interlock the primary tumbler with said fence but inoperative to interlock the secondary tumbler with said fence or to release it therefrom, and an emergency key for protracting and retracting said bolt, operable to engage both of said tumblers with said fence and to disengage them therefrom.

20. In a lock, a dead bolt, primary and secondary tumblers carried thereby, a fence adapted to be engaged by said tumblers, a thumb turn member for protracting said bolt, adapted to interlock both tumblers with said fence, a cylinder lock, and a key for said cylinder lock, adapted to protract said bolt and to interlock the primary tumbler with said fence but inoperative to interlock the secondary tumbler with it to disengage it from said fence.

21. In a lock, a dead bolt, a fence, two tumblers pivoted on said dead bolt and coöperating with said fence, a key for giving both of said tumblers complete actuations with respect to said fence, a key for giving one of said tumblers a complete actuation with respect to said fence, and a thumb turn member for protracting and retracting said bolt, adapted to give both of said tumblers complete actuations with respect to said fence.

22. In a lock, a dead bolt, two pivoted tumblers carried thereby, locking means for the bolt coöperating with said tumblers, a key for protracting the bolt, adapted to give both tumblers complete actuations, a second key for protracting the bolt, adapted to give one tumbler a complete actuation, and a thumb turn member for protracting said bolt, adapted to give both tumblers complete actuations.

In witness whereof, I have hereunto set my hand on the 26th day of April, 1916.

HENRY G. VOIGHT.

Copies of this patent may be obtained for five cents each, by addressing the "Commissioner of Patents, Washington, D. C."